United States Patent [19]

Lo

[11] Patent Number: 4,728,960
[45] Date of Patent: Mar. 1, 1988

[54] MULTIFUNCTIONAL MICROSTRIP ANTENNAS

[75] Inventor: Yuen T. Lo, Urbana, Ill.

[73] Assignee: The United States of America as represented by the Secretary of the Air Force, Washington, D.C.

[21] Appl. No.: 872,587

[22] Filed: Jun. 10, 1986

[51] Int. Cl.[4] .................................................. H01Q 1/38
[52] U.S. Cl. .............................. 343/700 MS; 343/701
[58] Field of Search ................. 343/700 MS File, 701

[56] References Cited

U.S. PATENT DOCUMENTS

| Re. 29,296 | 7/1977 | Krutsinger et al. | 343/700 MS |
|---|---|---|---|
| 3,478,362 | 1/1966 | Ricardi et al. | 343/700 MS |
| 3,564,842 | 1/1986 | Suzuki | 343/700 MS |
| 3,665,480 | 5/1972 | Fassett | 343/700 MS |
| 3,757,344 | 9/1973 | Pereda | 343/770 |
| 4,040,060 | 8/1977 | Kaloi | 343/700 MS |
| 4,067,016 | 1/1978 | Kaloi | 343/700 MS |
| 4,078,237 | 3/1978 | Kaloi | 343/700 MS |
| 4,125,839 | 11/1978 | Kaloi | 343/700 MS |
| 4,130,822 | 12/1978 | Conroy | 343/700 MS |
| 4,157,548 | 6/1979 | Kaloi | 343/700 MS |
| 4,191,959 | 3/1980 | Kerr | 343/700 MS |
| 4,197,545 | 4/1980 | Favaloro et al. | 343/700 MS |
| 4,242,685 | 12/1980 | Sanford | 343/770 |
| 4,326,203 | 4/1982 | Kaloi | 343/700 MS |
| 4,367,474 | 1/1983 | Schaubert et al. | 343/700 MS |
| 4,379,296 | 4/1983 | Farrar et al. | 343/700 MS |
| 4,386,357 | 5/1983 | Patton | 343/700 MS |
| 4,464,663 | 8/1984 | Lalezari et al. | 343/700 MS |
| 4,489,328 | 12/1984 | Gears | 343/700 MS |
| 4,510,498 | 4/1985 | Mori et al. | 343/435 |

OTHER PUBLICATIONS

Paper entitled "Multifunctional Microstrip Antennas," by the inventors at the 1985 (Jun. 17) IEEE AP-S International Symposium.

Primary Examiner—James W. Davie
Assistant Examiner—Hoanganh Le
Attorney, Agent, or Firm—William G. Auton; Donald J. Singer

[57] ABSTRACT

A microstrip antenna system that is capable of simultaneously transmitting an outgoing circularly polarized wave while receiving an incoming circularly polarized wave using a microstrip patch antenna element and a signal processing network is disclosed. The signal processing system connects the antenna element to a transmitter and receiver and produces a phase-shifted transmitted signal in order to isolate the receiver from the transmitted signal by nulling it.

2 Claims, 8 Drawing Figures

LEGEND ------- with a network
——— without a network

MULTIFUNCTIONAL MICROSTRIP ANTENNAS

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to microstrip antennas, and more particularly to a microstrip antenna system which combines a two-port, rectangular patch microstrip antenna with a signal processing system which enables the patch antenna to transmit and receive two circularly polarized waves of opposite senses simultaneously.

Microstrip antennas, despite their limited bandwidths, can be designed to perform many functions, sometimes even simultaneously. For example, a single element can easily be made to transmit (T) and receive (R) simultaneously two waves of orthogonally linear polarizations (LP), either at the same or two different frequencies. It can also be designed to transmit and/or receive two waves of the same linear polarization at two different frequencies with a single input port. There are also many possible designs for a single element to transmit or receive a circularly polarized (CP) wave of either the right-hand (RH) or left-hand (LH) sense, but not simultaneously.

The task of producing a microstrip antenna system which is capable of transmitting and receiving circularly polarized waveforms has been alleviated, to some degree, by the following U.S. Patents, which are incorporated herein by reference:

U.S. Pat. No. 4,379,296, issued to Farrar et al on Apr. 5, 1983;
U.S. Pat. No. 4,367,474, issued to Schaubert et al on Jan. 4, 1983;
U.S. Pat. No. 4,386,357, issued to Patton on May 31, 1983;
U.S. Pat. No. 4,040,060, issued to Kaloi on Aug. 2, 1977;
U.S. Pat. No. 29,296, issued to Krutsinger et al on July 5, 1977;
U.S. Pat. No. 4,191,959, issued to Kerr on Mar. 4, 1980;
U.S. Pat. No. 4,489,328, issued to Gears on Dec. 18, 1984;
U.S. Pat. No. 4,130,822, issued to Conroy on Dec. 19, 1978;
U.S. Pat. No. 4,197,545, issued to Favloaro et al on Apr. 8, 1980;
U.S. Pat. No. 4,242,685, issued to Sanford on Dec. 30, 1980;
U.S. Pat. No. 3,757,344, issued to Pereda on Sept. 4, 1973; and
U.S. Pat. No. 4,078,237, issued to Kaloi on Mar. 7, 1978.

U.S. Pat. Nos. 4,379,296; 4,367,474; 4,386,357; 4,040,060; and 4,078,237 disclose patch antennas which include shorting pins. U.S. Pat. Nos. 29,246; 4,191,959; 4,489,328; 4,130,822; 4,197,545; 4,242,685; and 3,757,344 disclose patch antennas with slots therein.

A further development in the field of microstrip antenna technology is disclosed in the U.S. Patent Application of Dr. Yuen T. Lo and Mr. Bao F. Wang entitled "Dual Frequency Microstrip Antenna", Ser. No. 771,529 filed Oct. 21, 1985, the disclosure of which is incorporated by reference. The dual frequency microstrip antenna includes a single element patch which is capable of dual frequency operation, and used shorting pins and/or slots placed on the patch to vary the ratio of the two band frequencies.

While the references cited above are instructive, there remains a need to provide a microstrip antenna system which is capable of simultaneously transmitting and receiving circularly polarized waves. The present invention is intended to satisfy that need.

SUMMARY OF THE INVENTION

The present invention is a multifunctional microstrip antenna system which combines a two-port microstrip patch antenna element with a signal processing network which is capable of simultaneous transmission and reception of circularly polarized waves (which have opposing polarization senses).

The signal processing network electrically connects the antenna element to both a transmitter and to a receiver in a manner which isolates the receiver from the transmitted signal. One embodiment of this signal processing network comprises: one or two directional couplers; a phase shifter; and perhaps an attenuator (which can be eliminated). The attenuator conducts signals from the transmitter to the antenna element while providing an adjustable amount of the transmitted signal. The phase shifter is electrically connected to the transmitter and conducts the transmitted signal to the directional coupler while shifting its phase and producing a phase shifted transmitted signal. The directional coupler is electrically connected between: the output port of the antenna element; to the phase shifter; and the receiver. This coupler receives any incoming signals as well as the transmitted signal from the antenna element and nulls the transmitted signal with the phase shifted transmitted signal it receives from the phase shifter. The result is that the receiver receives only the incoming signals, even during simultaneous transmission and reception of either circularly polarized or linearly polarized waveforms. The attenuator serves to attenuate the transmitted signal before it enters into the antenna element so that the amplitudes of the transmitted signal received by the directional coupler have approximately the same amplitude as the phase shifted transmitted signal provided by the phase shifter.

The signal processing system described above is combined with either a square patch antenna element, or a truncated patch antenna element to provide a properly attenuated and phase shifted transmitted signal to cancel the leaked transmitted signal before it reaches the receiver. Since incoming signals have amplitudes well below those being transmitted, simultaneous transmission and reception may be accomplished without significant contamination of the transmitted signals by the incoming signals.

It is an object of the present invention to provide a multifunctional microstrip antenna system capable of simultaneous transmission and reception of circularly polarized signals with opposing senses of polarization.

It is another object of the present invention to provide a microstrip antenna system capable of simultaneous transmission and reception of linearly polarized signals with opposing senses of polarization.

These objects together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention is a microstrip antenna system which combines a two-port rectangular patch microstrip antenna element with a signal processing system which enables the patch antenna element to simultaneously transmit and receive circularly polarized waves which have opposing polarization senses.

It is easy to design a rectangular microstrip antenna either to transmit or to receive or to transmit and receive simultaneously waves of two orthogonal linear polarizations (LP) at the same or two different frequencies with high isolation. But for circular polarization (CP) the problem is very much different because, first, there seems to be no nodal field locus in the patch which can be used for both circular polarization excitation and high isolation, and, second, the coupling under the patch is through a circuit mechanism where orthogonality of the two circularly polarized waves cannot normally be used to discriminate against each other.

High isolation between two separate patch antennas is ordinarily obtained by separating the patch elements so that they are far apart. This implies that for high isolation a large space is needed to accommodate the antennas. However, the present invention achieves high isolation, not so much through a new antenna element design, but through a signal processing network since, as stated above, for CP microstrip antennas there is no nodal field locus useful for both CP excitation and high isolation.

Figure 1:
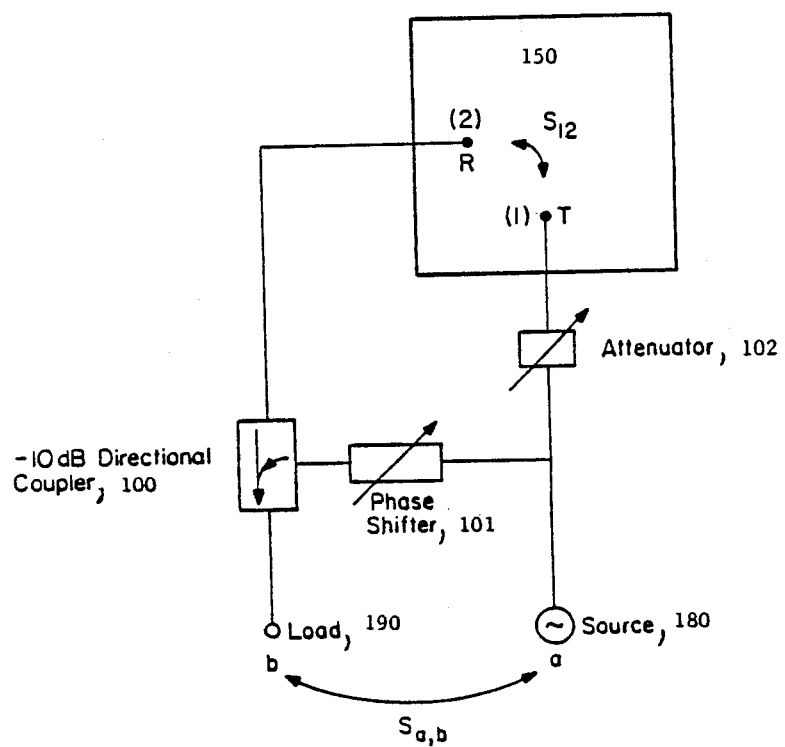
FIG. 1 is a schematic of the microstrip antenna system of the present invention.

FIG. 1 shows an embodiment of the present invention consisting of a directional coupler 100, a phase shifter 101, and an attenuator 102, connected to the two ports marked T and R of a patch antenna element 150 and a source 180 and load 190. In this system, a controlled amount of the transmitted signal with a shifted phase is fed through the directional coupler to cancel the transmitted signal at the receiving port 190.

The attenuator 102 conducts signals from the transmitter 180 to the antenna element 150 while providing an adjustable amount of the transmitted signal. The phase shifter 101 is electrically connected to the transmitter 180 and conducts the transmitted signal to the directional coupler 100 while shifting its phase and producing a phase shifted transmitted signal. The directional coupler is electrically connected between: the output port of the antenna element 150; the phase shifter 101; and the receiver 190. This coupler 100 receives any incoming signals as well as the transmitted signal from the antenna element and nulls the transmitted signal with the phase shifted transmitted signal it receives from the phase shifter. The result is that the receiver 190 receives only the incoming signals, even during simultaneous transmission and reception of either circularly polarized or linearly polarized waves. The attenuator 102 serves to attenuate the transmitted signal before it enters into the antenna element so that the amplitudes of the transmitted signal received by the directional coupler have approximately the same amplitude as the phase shifted transmitted signal provided by the phase shifter.

Figure 2A:
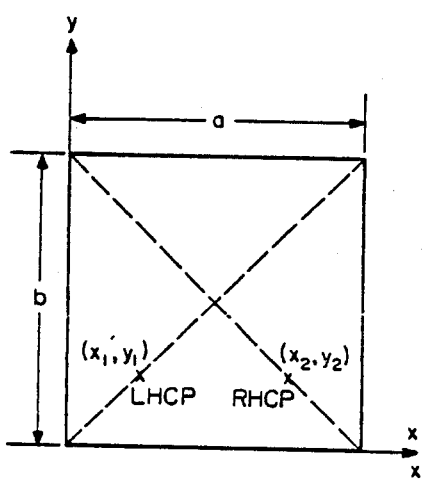
FIGS. 2A and 2B are illustrations which illustrate two patch microstrip antennas which among many others may be used in the system of FIG. 1.
Figure 2B:
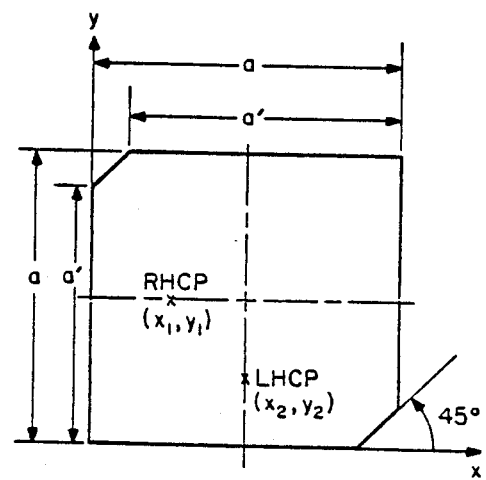

FIGS. 2A and 2B are schematics which respectively illustrate two patch antennas, one exactly square with two opposite corners removed (called a truncated square patch) and a nearly square patch, are suitable for use as the patch antenna element 150. Their dimensions are discussed separately below in Tables 1 and 2. The two port positions (x,y) are so determined that a good CP and a good input impedance are obtained when one port is excited and the other terminated with a 50 ohm load.

TABLE 1

| FIG. 2A Dimensions (mm) | |
|---|---|
| $x_1 = 19.5$ | $y_1 = 18.5$ |
| $x_2 = 55.5$ | $y_2 = 18.5$ |
| width (b) = 71 mm | length (a) = 76 mm |

TABLE 2

| FIG. 2B Dimensions (mm) | |
|---|---|
| $x_1 = 16.5$ | $y_1 = 36.3$ |
| $x_2 = 36.3$ | $y_2 = 16.5$ |
| length(a) = 72.5 mm | a' = 62.7 mm |

Both the patch antennas elements of FIGS. 2A and 2B were made of Rexolite 2200, 1/16" thick, with a ground plane only 0.4 to 0.6 $\lambda$ larger than the patch on each side. Both the left hand circular polarization (LHCP) and right hand circular polarization (RHCP) ports are activated in use.

Figure 3:
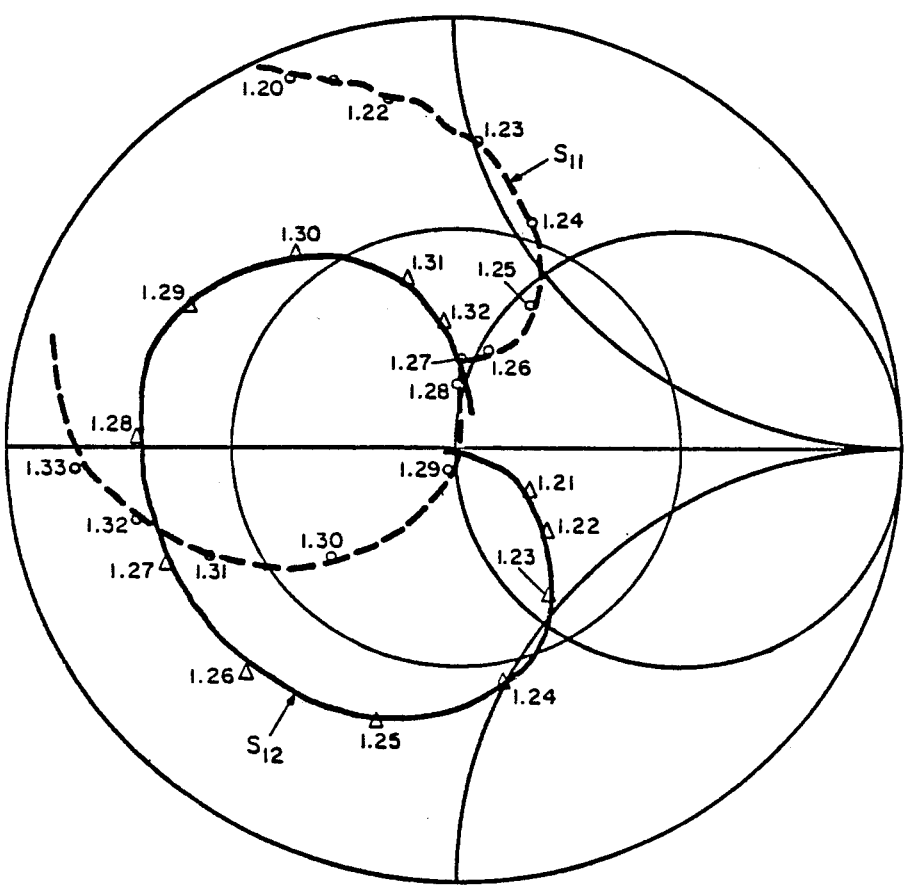
FIG. 3 is a chart depicting measurements of the truncated patch element of FIG. 2B without the benefit of the signal processing network of FIG. 1.

FIG. 3 is a chart depicting $S_{11}$ and $S_{12}$ measurements of the truncated patch of FIG. 2B without the benefit of the signal processing network of FIG. 1. The $S_{11}$ measurements are depicted by the dashed lines, and the $S_{12}$ measurements are depicted by the solid lines. The purpose of FIG. 3 is to provide a basis of comparison with FIG. 4 which indicates the effectiveness of the signal processing network of FIG. 1.

Figure 4:
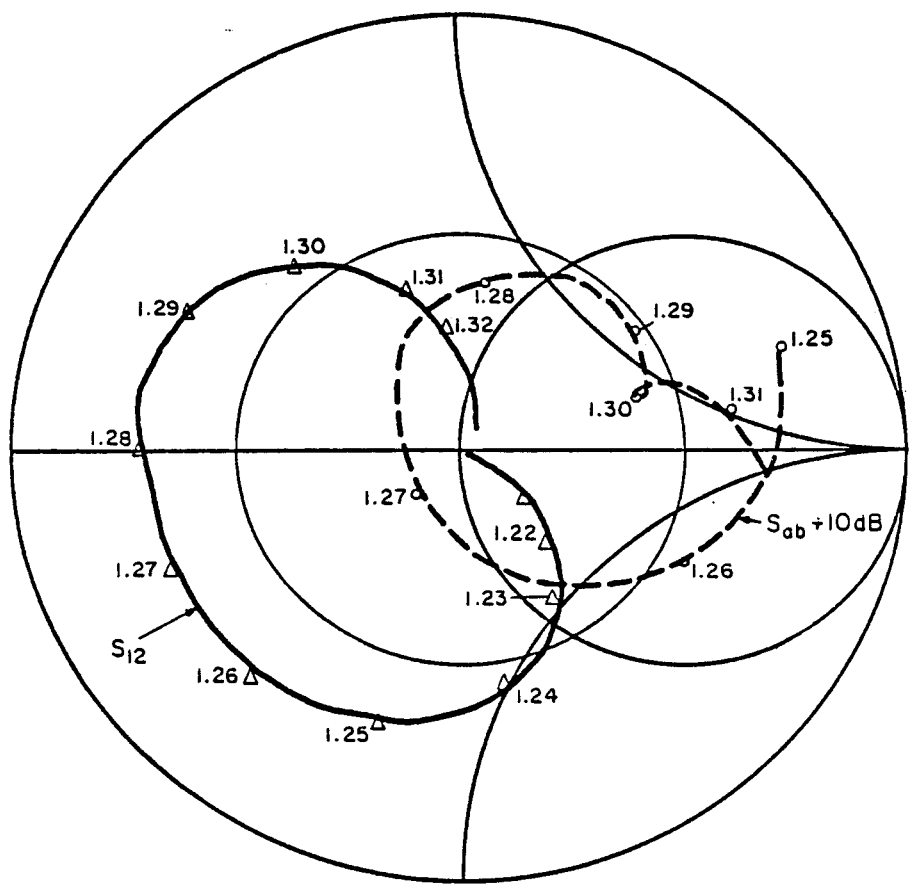
FIG. 4 is a chart depicting measurements of the truncated patch element of FIG. 2B when combined with the signal processing system of FIG. 1.

FIG. 4 is a chart depicting $S_{12}$ and $S_{ab}$ measurements of the truncated patch of FIG. 2B both without the network of FIG. 1 (indicated by the solid lines) and with the network of FIG. 1 (as indicated by the dashed lines).

As shown in FIG. 3, from $S_{11}$, the operating center frequency should be around 1.27 GHz. At this frequency $S_{12} \simeq -3$ dB, indicating a very strong coupling. With the network inserted and properly balanced, $S_{ab}$ is reduced drastically to approximately $-30$ dB, as shown in FIG. 4. The improvement from $-3$ dB to $-30$ dB is very remarkable indeed. The measured CP radiation patterns with a rotating dipole for this patch antenna without and with the network when excited at the RHCP port and terminated at the LHCP port at 1.247 GHz are shown in FIGS. 5A and 5B.

Figure 5A:
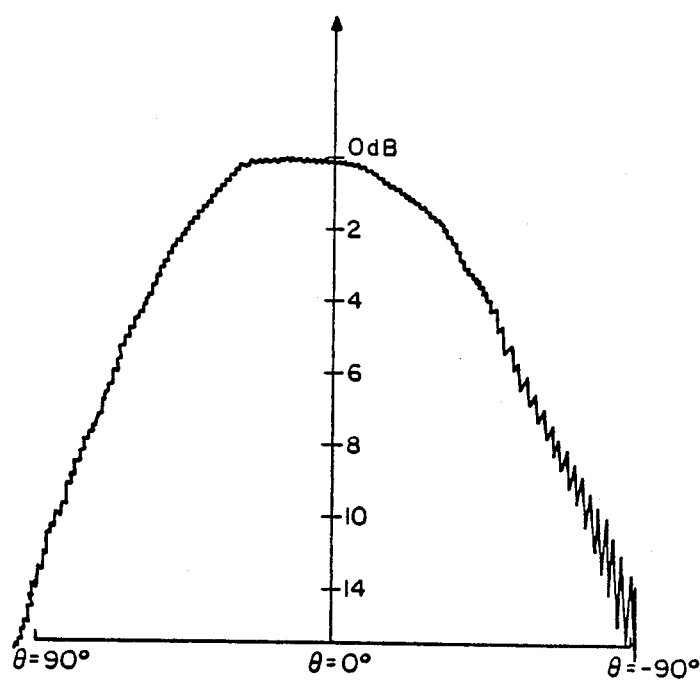
FIG. 5A is a chart depicting the circular polarization radiation patterns emitted from the antenna element of FIG. 2B without the signal processing system of FIG. 1.

FIG. 5A is a chart depicting circular polarization radiation patterns emitted from the antenna element of FIG. 2B without the benefit of the signal processing system of FIG. 1. To obtain this pattern a signal source was used to input a 1.247 GHz signal into the right hand circular polarization port while the left-hand circular port was terminated with a 50 ohm load to simulate the receiver.

Figure 5B:
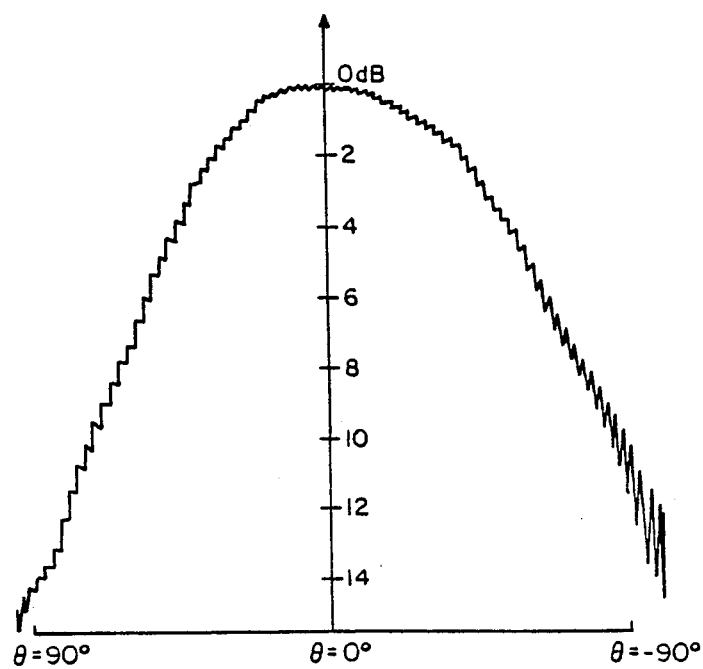
FIG. 5B is a chart depicting the circular polarization radiation patterns emitted from the antenna element of FIG. 2B with the signal processing antenna element of FIG. 1.

FIG. 5B is a chart depicting the circular polarization radiation patterns emitted from the antenna element of FIG. 2B (as tested for FIG. 5A) with the benefit of the signal processing system of FIG. 1. A careful comparison of these patterns will show that the presence of the network has practically no effect on the patterns as transmitted out of the antenna element. It is also of great interest to see that all these patterns exhibit excellent CP, nearly perfect for the entire beam, even for the observation point near tht ground plane. Strictly speaking, near ground plane, the polarization must be linear. However, as noted in the discussion of FIGS. 2A and 2B, the ground plane of this antenna is rather small, only about 0.4 $\lambda$ to 0.6 $\lambda$ larger than the patch itself on each side. In fact, this is found to be true for all CP patch antennas investigated; namely, a small ground plane almost always produces a better CP. Similar results were obtained when thme LHCP port was excited and the RHCP port terminated.

Figure 6:
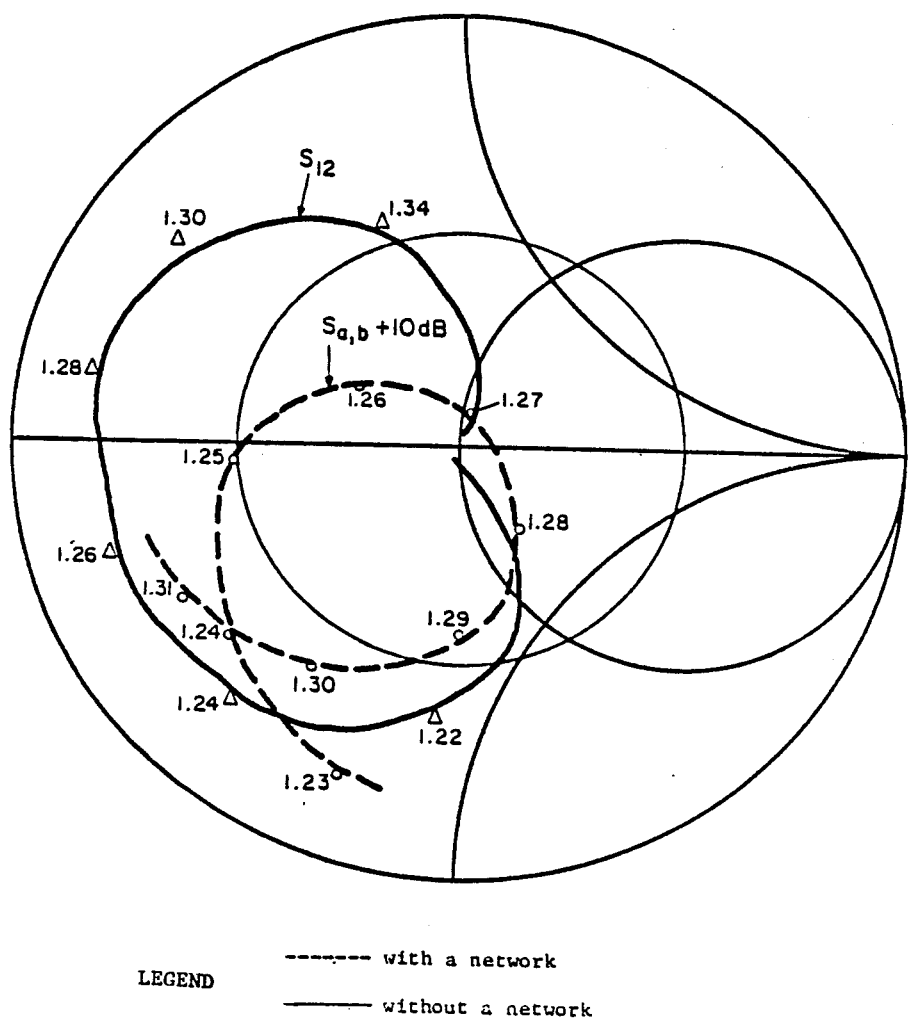
FIG. 6 depicts measured $S_{12}$ and $S_{ab}$ performance of the patch antenna of FIG. 2A with and without the signal processing system of FIG. 1.

The measured preformances for a nearly square patch as illustrated in FIG. 2A are similar and thus omitted except for those in FIG. 6 where it is seen once again that the $S_{12}$ of about $-3$ dB is reduced to about 31 30 dB between ports a and b at frequencies near 1.27 GHz.

The measured CP bandwidth (CPBW) for axial ratio less than 3 dB is about 4% which is almost 12 times wider than that of an ordinary single port CP patch with the same thickness. This is achieved because of a much lower O-factor due to the load in the patch. In fact, with the knowledge of the Q-factor value (i.e., with the loading effect taken into account), the approximate values of the patch dimensions, a and b, can still be determined by the simple formula $a/b = 1 + (1/Q)$ (where a equals the length and b equals the width of the patch antenna element). However, the load lowers the antenna gain by about 4 dB according to our preliminary measurements. In view of the vast improvement in circular polarization bandwidth, such a trade-off is very worthwhile indeed.

Suppose that a patch antenna is excited with a source at the RHCP Port 1 as shown in FIG. 1 and that the network is balanced for zero output at the receiver or load 190; then any incoming wave of LHCP will produce little output at Port 1 because of its excellent AR characteristics shown in FIG. 5B. This incoming LHCP wave signal, of course, will be received at Port 2 and appear at the receiver, 190. However, for an RHCP incoming wave, the signal will be received by Port 1, and then, via the phase shifter, appear at the receiver 190. In other words, Port 2 will receive both LHCP and RHCP incoming waves. In some applications, this may be immaterial. But for some other applications where only the LHCP incoming wave is allowed to be received at the receiver 190, a second directional coupler should then be used in place of the T junction between the source 180 and the load 190, and the phase shifter input port, so that the incoming signal which appears at Port 1 will not reach the phase shifter. In other words, the system becomes symmetrical between the two ports.

Finally, it should be noted that the network shown in FIG. 1 is only an example of the present invention that was experimental purposes to verify the feasibility of the concept.

While the invention has been described in its presently preferred embodiment it is understood that the words which have been used are words of description rather than words of limitation and that changes within the purview of the appended claims may be made without departing from the scope and spirit of the invention in its broader aspects.

What is claimed is:

1. A multifunctional microstrip antenna system capable of simultaneously transmitting an outgoing circularly polarized wave and receiving an incoming circularly polarized wave when said incoming circularly polarized wave has an opposite sense of polarization with respect to said outgoing circularly polarized wave, said multifunctional microstrip antenna system comprising:

a signal source which generates said outgoing circularly polarized wave;

a microstrip patch antenna element which transmits said outgoing circularly polarized wave while simultaneously receiving said incoming circularly polarized wave wherein said microstrip patch antenna element comprises a truncated rectangular patch element which has at least one set of opposing corners removed, said truncated rectangular patch element having an input port which receives said outgoing circularly polarized wave thereby, said truncated rectangular patch element having an output port which outputs simultaneously said outgoing circularly polarized wave as well as said incoming circularly polarized wave;

an attenuating means which is electrically connected to said signal source and said microstrip patch antenna element to conduct said outgoing circularly polarized wave from said signal source to said microstrip patch antenna element while providing an attenuation to said outgoing circularly polarized wave;

a phase shifter which is electrically connected with said signal source and produces a phase-shifted outgoing circularly polarized wave which when combined with said outgoing circularly polarized wave acts to null it, wherein said phase shifter comprises a fixed phase shifter which provides a fixed phase shift to said outgoing circularly polarized wave to produce said phase-shifted outgoing circularly polarized wave;

a directional coupler which is electrically connected with said phase shifter and said microstrip patch antenna element, said directional coupler thereby receiving said outgoing circularly polarized wave which is nulled with said phase-shifted outgoing circularly polarized wave as well as receiving conducting and outputting said incoming circularly polarized wave; and a receiver which is electrically connected to and receives said incoming circularly polarized wave from said directional coupler.

2. A multifunctional microstrip antenna system capable of simultaneously transmitting an outgoing circularly polarized wave and receiving an incoming circularly polarized wave when said incoming circularly polarized wave has an opposite sense of polarization with respect to said outgoing circularly polarized wave, said multifunctional microstrip antenna system comprising:
- a signal source which generates said outgoing circularly polarized wave;
- a microstrip patch antenna element which has an input port which is electrically connected to and receives said outgoing circularly polarized wave from said signal source so that it transmits said outgoing circularly polarized wave while simultaneously receiving said incoming circularly polarized wave, said microstrip patch antenna element comprising a rectangular patch antenna element which has an output port over which it outputs said outgoing circularly polarized wave, and wherein said microstrip patch antenna element further comprises a truncated rectangular patch element which has at least one set of opposing corners removed;
- a phase shifter which is electrically connected with said signal soiurce and produces a phase-shifted outgoing circularly polarized wave which when combined with said outgoing circularly polarized wave acts to null it;
- a directional coupler whichis electrically connected with said phase shifter and said microstrip patch antenna element, said directional coupler thereby receiving said outgoing circularly polarized wave which is nulled with said phase-shifted outgoing circularly polarized wave as well as receiving conducting and outputting said incoming circularly polarized wave; and
- a receiver which is electrically connected to and receives said incoming circularly polarized wave from said directional coupler.

* * * * *